(12) United States Patent
Issler

(10) Patent No.: US 8,113,105 B2
(45) Date of Patent: Feb. 14, 2012

(54) TWO-PART PISTON FOR AN INTERNAL COMBUSTION ENGINE

(75) Inventor: Wolfgang Issler, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 618 days.

(21) Appl. No.: 12/315,969

(22) Filed: Dec. 8, 2008

(65) Prior Publication Data

US 2009/0151556 A1 Jun. 18, 2009

(30) Foreign Application Priority Data

Dec. 14, 2007 (DE) .................. 10 2007 060 472

(51) Int. Cl.
*F16J 1/04* (2006.01)
(52) U.S. Cl. .................... 92/220; 92/216; 92/217
(58) Field of Classification Search ............ 92/216, 92/217, 220, 255, 256
See application file for complete search history.

(56) References Cited

U.S. PATENT DOCUMENTS

| | | | |
|---|---|---|---|
| 3,573,999 A | 4/1971 | Gokyu | |
| 4,375,782 A * | 3/1983 | Schieber | 92/220 |
| 5,081,968 A * | 1/1992 | Bruni | 92/217 |
| 5,975,040 A * | 11/1999 | Silvonen et al. | 92/220 |
| 6,231,696 B1 | 5/2001 | Hensger et al. | |
| 6,622,613 B1 * | 9/2003 | Kortas et al. | 92/223 |
| 6,729,291 B1 * | 5/2004 | Scharp et al. | 92/216 |
| 7,302,927 B1 * | 12/2007 | Scharp et al. | 92/220 |
| 7,311,075 B2 * | 12/2007 | Ullrich | 92/220 |
| 7,584,694 B2 * | 9/2009 | Scharp | 92/255 |
| 7,934,482 B2 * | 5/2011 | Messmer | 92/220 |
| 7,946,268 B2 * | 5/2011 | Messmer | 92/220 |
| 2008/0263861 A1 * | 10/2008 | Issler | 29/888.044 |

FOREIGN PATENT DOCUMENTS

| | | |
|---|---|---|
| DE | 1 016 062 | 9/1957 |
| DE | 41 29 746 | 4/1993 |
| DE | 199 10 582 | 9/2000 |
| DE | 10 2005 060 548 | 12/2006 |
| DE | 10 2005 041 409 | 3/2007 |
| DE | 10 2007 019 931 | 10/2008 |
| FR | 7 52 700 | 9/1933 |
| JP | 01-121552 | 5/1989 |

OTHER PUBLICATIONS

International Search Report of PCT/DE2008/001997 in German.

* cited by examiner

*Primary Examiner* — Michael Leslie
(74) *Attorney, Agent, or Firm* — Collard & Roe, P.C.

(57) ABSTRACT

A two-part piston for an internal combustion engine has an upper part that has a pin having an outside thread on the underside of its piston crown, and has a lower part that has a crown part, onto which an expansion sleeve that can stretch elastically in the axial direction is formed, radially on the inside. A pin is introduced into the sleeve in order to screw the upper part to the lower part. The expansion sleeve is stretched in the axial direction. In order to improve its strength, the material of the expansion sleeve has a higher stretching limit as compared with the rest of the piston material. The increase in the stretching limit is achieved by permanent stretching of the expansion sleeve in the axial direction, by approximately 1% of its length.

5 Claims, 2 Drawing Sheets ly known from German Patent Application No. DE 10 2005 060 548 A1; it consists of an upper part having a pin disposed
TWO-PART PISTON FOR AN INTERNAL COMBUSTION ENGINE

CROSS REFERENCE TO RELATED APPLICATIONS

Applicant claims priority under 35 U.S.C. §119 of German Application No. 10 2007 060 472.8 filed Dec. 14, 2007.

BACKGROUND OF THE INVENTION

1. Field of the Invention

The invention relates to a two-part piston for an internal combustion engine.

2. The Prior Art

A two-part piston for an internal combustion engine is known from German Patent Application No. DE 10 2005 060 548 A1; it consists of an upper part having a pin disposed coaxially on the underside of its piston crown, which pin has an outer thread, and of a lower part having an expansion sleeve formed onto the crown part, which sleeve is disposed coaxially, radially on the inside, and can stretch elastically in the axial direction. When the upper part is screwed together with the lower part, the pin is introduced into the expansion sleeve, and afterwards, the nut is screwed onto the pin, which stretches the expansion sleeve in the axial direction. It is a disadvantage, in this connection, that during engine operation, a force that is directed axially can be exerted onto the expansion sleeve, which force exceeds the stretching limit of the expansion sleeve material, and leads to permanent longitudinal expansion of the expansion sleeve and thus to loosening of the screw connection between the upper part and the lower part of the piston.

SUMMARY OF THE INVENTION

It is an object of the present invention to avoid this disadvantage of the state of the art. This object is accomplished with a two-part piston for an internal combustion engine, having an upper part that forms a piston crown, and a cylindrical pin that lies coaxial to the piston axis and has an outside thread formed on the underside of the piston crown, facing away from the piston crown. The piston has a lower part that consists of a crown part on the underside of which pin bosses having pin bores and skirt elements that connect the pin bosses with one another are disposed.

The crown part has a second opening that lies coaxial to the piston axis, at the edge of which opening an expansion sleeve, which is directed upward and is elastically stretchable in the axial direction, is formed. The sleeve has a first opening at its piston-crown-side end, and the pin is introduced into the first and the second opening. The first opening is provided with a crimping that is directed radially inward, the inside radius of which is greater than the outside radius of the pin. The upper part and the lower part are connected with one another by a nut screwed onto the outside thread of the pin, which rests against the crimping on the piston crown side. The material of which the expansion sleeve consists has a stretching limit that is higher as compared with the rest of the piston material.

In order to increase the stretching limit, the expansion sleeve can be plastically deformed in the axial direction, proceeding from the finished lower piston part, by approximately 1% of its length. Alternatively, the expansion sleeve can be stretched or compressed in the axial direction, proceeding from the finished lower piston part.

In one embodiment, the nut has an elastic compression sleeve that lies coaxial to the piston axis and is elastic in the axial direction, on the piston crown side, which rests against the crimping in the finished, assembled piston. The material of the sleeve has a greater stretching limit as compared to the rest of the material of the nut. In order to increase the stretching limit, the compression sleeve can be is compressed in the axial direction, by approximately 1% of its length.

With the invention, the result is achieved, by means of a plastic deformation of the expansion sleeve in the axial direction, that the stretching limit of the expansion sleeve material is increased to such an extent that at the tensile stress on the expansion sleeve that is usual during engine operation, there is no risk of plastification of the expansion sleeve material and thus of loosening of the screw connection between upper piston part and lower piston part.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
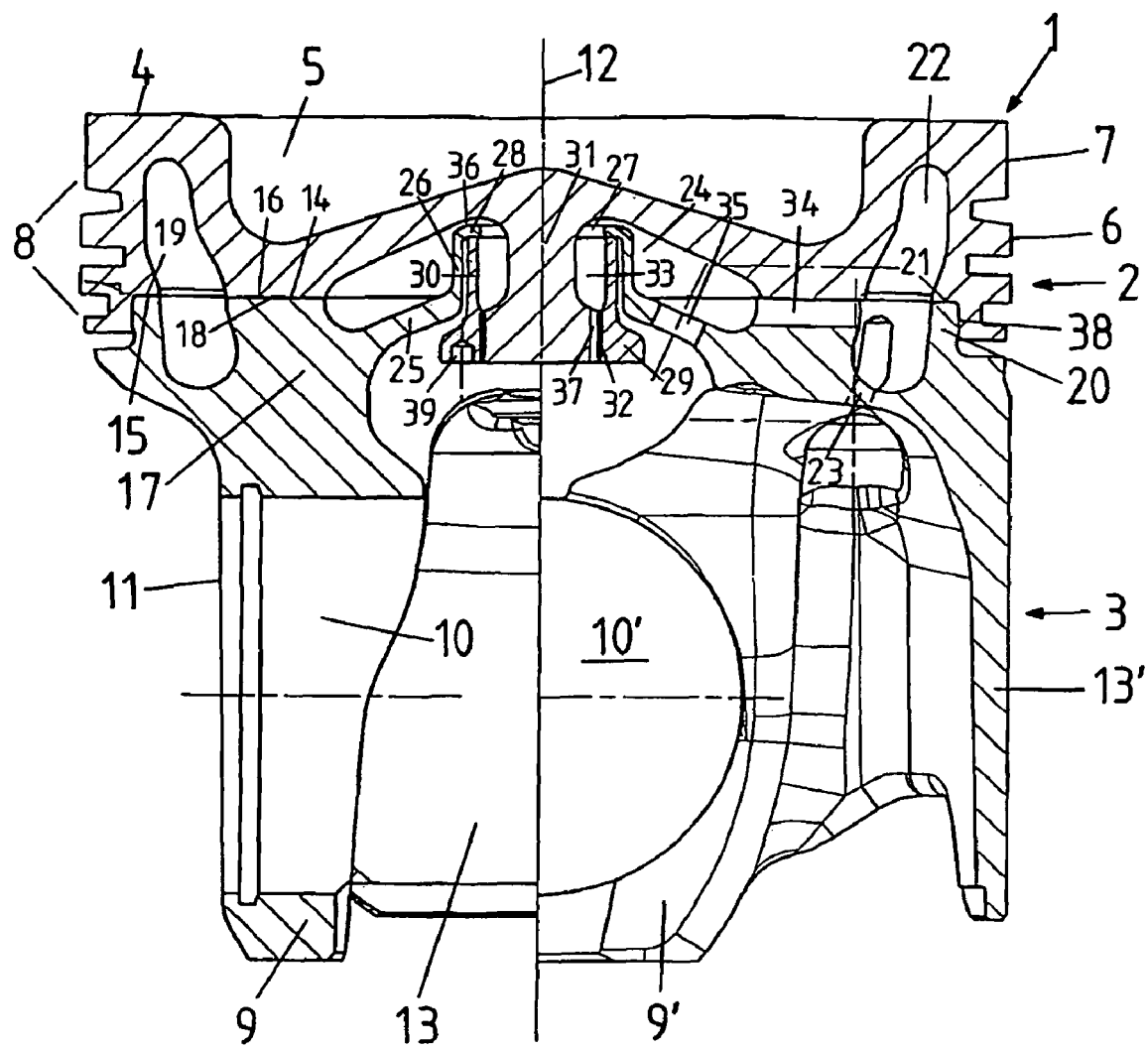
FIG. 1 shows a section of a two-part piston, the upper part and the lower part of which are screwed to one another by means of a nut having a formed-on compression sleeve.

Referring now in detail to the drawings, FIG. 1 shows a two-part, cooled piston 1, which consists of an upper part 2 and a lower part 3. Upper part 2 and lower part 3 can be made from steel or from another metallic material. A piston crown 4 delimits the axial top of upper part 2, and its radial inner region has a combustion bowl 5. A ring wall 6 is formed onto the outer edge of piston crown 4, and its outer surface forms a top land 7 on the piston crown side, followed by a ring belt 8 having ring grooves for accommodating piston rings, not shown in the figure, on the skirt side.

On the underside of lower part 3, which faces away from piston crown 4, two pin bosses 9, 9' each having a pin bore 10, 10' are disposed; their face sides 11 are disposed set back relative to ring wall 6, in the direction of piston axis 12. Pin bosses 9, 9' are connected with one another by way of piston skirt elements 13, 13'.

Upper part 2 and the lower part 3 of piston 1 are connected with one another by way of an inner contact part 14 and by way of an outer contact part 15 disposed concentrically to the former. Inner contact part 14 is formed by a contact surface 16 disposed on the side of upper part 2 that faces away from the combustion bowl 5, and by a contact surface 18 disposed on a ring-shaped support rib 17 of lower part 3, on the piston crown side. Outer contact part 15 is formed by a contact surface 19 that delimits the underside of ring wall 6, and by a contact surface 21 disposed on a ring-shaped support crosspiece 20 of lower part 3, on the piston crown side.

A cooling channel 22 disposed in the edge region of piston 1, on the piston crown side, is formed by upper part 2 and by lower part 3 of piston 1; its radially outer delimitation is formed partly by ring wall 6, its radially inner delimitation is formed partly by support rib 17 and partly by piston crown 4, and its axially lower delimitation is formed by lower part 3 of piston 1. Cooling oil is introduced into cooling channel 22 by way of inlet openings 23.

Piston 1 has another ring-shaped cooling channel 24, disposed coaxial to piston axis 12, which has a lesser radial diameter than outer cooling channel 22, and is disposed, seen in the radial direction, within outer cooling channel 22. Axially at the top, inner cooling channel 24 is delimited by piston crown 4, radially on the outside by support rib 17, and radially at the bottom by an upper crown part 25 of the lower part 3, which is configured to have a thin wall and to be elastically resilient; an expansion sleeve 26 is formed onto this upper crown part, radially on the inside, and directed axially upward; its first opening 27, which lies axially at the top, is provided with a crimping 28 that is directed radially inward, to such an extent that the underside of crimping 28 can serve as a stop for a compression sleeve 30 formed onto a nut 29. In this connection, expansion sleeve 26 forms the radially inner delimitation of inner cooling channel 24. In the axial direction, expansion sleeve 26 has a second opening 43 on its side that lies opposite first opening 27. (See FIG. 2 in this regard.)

A cylindrical pin 31 having a mantle surface is formed onto the underside of piston crown 4, coaxial to piston axis 12; the mantle surface has an end region that faces away from the piston crown, having an outside thread 32 that corresponds to the inside thread of nut 29, so that nut 29 can be screwed onto outside thread 32. The axial length of pin 31 corresponds approximately to the axial length of nut 29 provided with compression sleeve 30. The radial diameter of pin 31 and, in particular, of its outside thread 32, are less than the radial diameter of the first opening 27 of expansion sleeve 26, so that pin 31 can easily be introduced into first opening 27. The radial inside diameter of compression sleeve 30 is greater than the radial outside diameter of outside thread 32 of pin 31.

In the present embodiment, the radial diameter of pin 31 is configured to be less in a region between its outside thread 32 and the underside of piston crown 4 than the diameter of outside thread 32, and also less than the inside diameter of compression sleeve 30, so that a ring-shaped cooling chamber 33 is formed between compression sleeve 30 and pin 31.

Cooling oil is introduced into outer cooling channel 22 by way of inlet openings 23; it flows into inner cooling channel 24 by way of a connection channel 34, and from there, part of the oil flows back into the crankcase by way of an opening 35 in upper crown part 25 of lower part 3. A small part of the oil flows into cooling chamber 33, by way of a gap 36 between crimping 28 and the lower surface of piston crown 4, and by way of first opening 27 of expansion sleeve 26, and from there it flows back into the crankcase by way of run-off channels that are worked into the outside thread 32 of pin 31 and lie parallel to piston axis 12; one run-off channel 37 is shown in FIG. 1. This brings about very good cooling of upper part 2 of piston 1, which is subject to great thermal stress.

During assembly of upper part 2 and lower part 3 of piston 1, pin 31 that is disposed on the underside of piston crown 4 is first passed through first opening 27 of expansion sleeve 26, which is formed onto second opening 43 in upper crown part 25 of the lower piston part 3. During the further progression of assembly of piston 1, upper part 2 and lower part 3 of piston 1 are oriented coaxial to one another, which is achieved in that support crosspiece 20, in section, has the shape of a step directed radially inward and axially in the direction of piston crown 4. The lower face side of ring wall 6 has a cylindrical recess 38 on the inside, the inside shape of which recess corresponds to the outside shape of the support crosspiece 20, so that during assembly of upper and lower part 2, 3 of piston 1, support crosspiece 20 is introduced into recess 38, and thereby upper part 2 and lower part 3 are aligned coaxially.

Subsequent to this, compression sleeve 30 of nut 29 is pushed over outside thread 32 of pin 31, until inside thread of nut 29 comes into contact with outside thread 32 of pin 31. Nut 29 is now screwed onto outside thread 32 until the upper face side of compression sleeve 30 makes contact with crimping 28 of expansion sleeve 26.

Further tightening of nut 29, with the application of a certain torque, now brings about the result that the elastically resilient upper crown part 25 deforms in the direction of piston crown 4, in the manner of a plate spring; that expansion sleeve 26, which is configured to have a thin wall, stretches axially; that compression sleeve 30, which is also configured to have a thin wall, is compressed axially; that the center part of pin 31, which has a reduced radial diameter, experiences an expansion; and that the part of piston crown 4 that delimits combustion bowl 5 deforms in the skirt direction, in the manner of a plate spring. These elastic deformations of piston parts 25, 26, 30, 31, and 4 bring about a very flat characteristic line of the screw connection between nut 29 and pin 31, which gives this screw connection great strength, independent of temperature influences and of mechanical influences on piston 1.

In this connection, there is the risk, during engine operation, that a force that goes beyond the stretching limit of the expansion sleeve material is exerted on expansion sleeve 26 in the direction of arrow 40, particularly during the suction cycle, leading to permanent longitudinal expansion of this material and thus to loosening of the screw connection between upper part 2 and lower part 3 of piston 1. For this reason, it is proposed, according to the invention, to increase the stretching limit of the expansion sleeve material in that the expansion sleeve is subjected to controlled tensile stress in the cold state, thereby experiencing permanent expansion in the axial direction of approximately 1% of its length, without the ductility of the expansion sleeve material being impaired when this is done.

Figure 2:
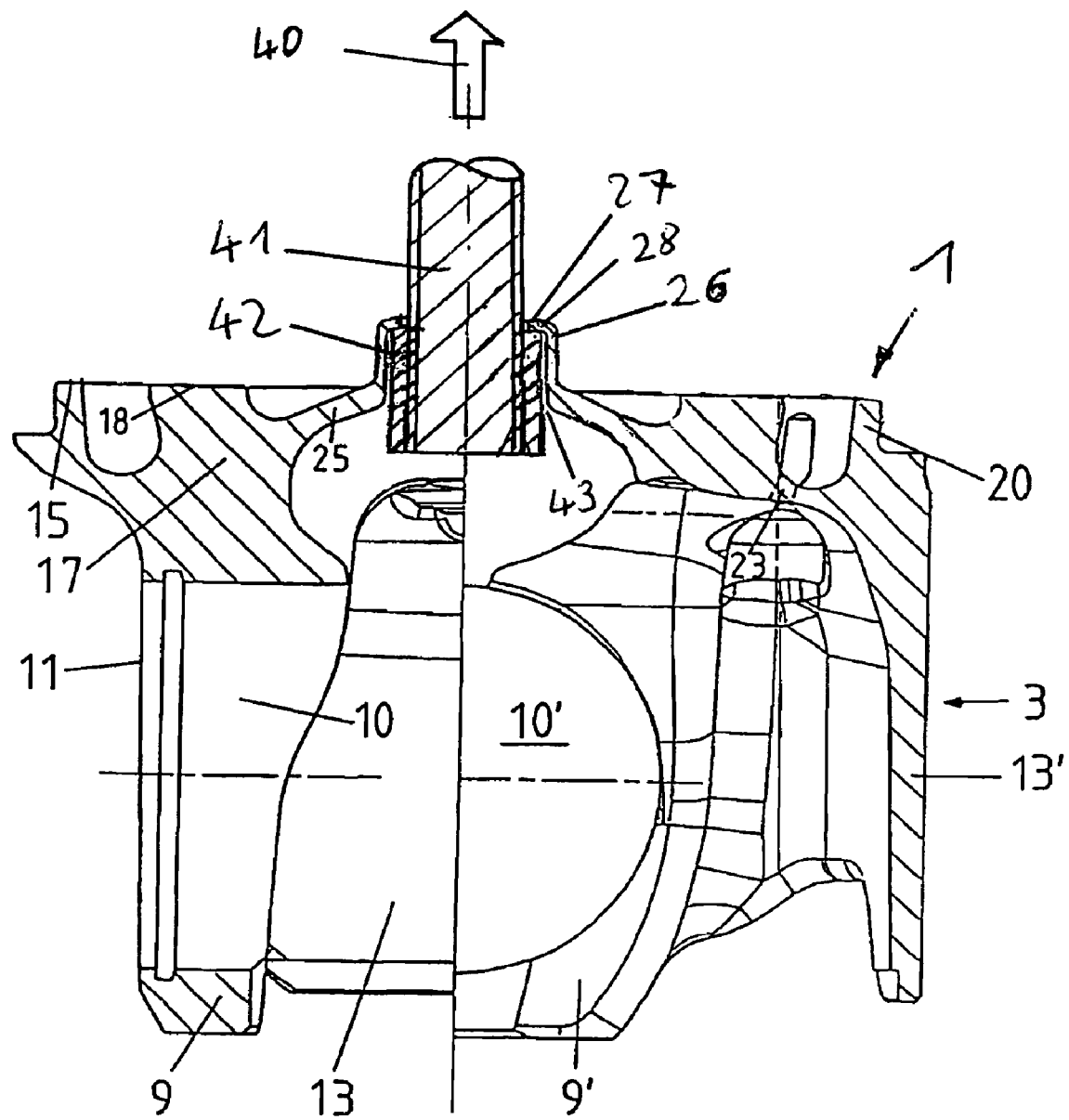
FIG. 2 shows an assembly aid with which the stretching limit of an expansion sleeve affixed to the lower piston part is increased, by means of a permanent expansion.

In order to exert the proposed tensile stress on expansion sleeve 26, according to FIG. 2, a threaded pin 41 having an outside diameter that is slightly smaller than the inside diameter of first opening 27 in crimping 28 that delimits expansion sleeve 26 on the piston crown side can be used, so that threaded pin 41 can easily be passed through first opening 27 and second opening 43. At the lower end, a nut 42 having a cylindrical outside surface is screwed onto threaded pin 41; its outside diameter is slightly smaller than the inside diameter of expansion sleeve 26, but slightly greater than the inside diameter of first opening 27, so that threaded pin 41, with nut 42 screwed on, can be passed through second opening 43 and through the interior of expansion sleeve 26, until the upper face side of nut 42 makes contact with the underside of crimping 28.

Subsequent to this, a tensile force is exerted on the threaded pin 41, in the direction of arrow 40, which exerts a controlled tensile stress on expansion sleeve 26, by way of nut 42 that is resting against crimping 28, in order to stretch expansion sleeve 26 in the axial direction, by approximately 1% of its length. In this connection, piston 1 is attached in an assembly device, not shown in FIG. 2.

In this way, the result is achieved that the stretching limit of the piston material is increased in the region of the expansion sleeve 26, to such an extent that in the case of tensile stress on expansion sleeve 26 during engine operation, there is no longer any risk of plastification of the expansion sleeve material and thus of a loss of the bias, i.e. loosening of the screw connection between upper piston part 2 and lower piston part 3.

To increase the stretching limit of the material of expansion sleeve 26, it is also possible to apply a calculated pressure force to expansion sleeve 26, by means of an assembly device not shown in the figures, which force compresses expansion sleeve 26 in the axial direction, by approximately 1% of its length.

Likewise, the stretching limit of the material of compression sleeve 30 can be increased in that compression sleeve 30 is exposed to a calculated pressure force, which compresses compression sleeve 30 by approximately 1% of its length.

Accordingly, while only a few embodiments of the present invention have been shown and described, it is obvious that many changes and modifications may be made thereunto without departing from the spirit and scope of the invention.

REFERENCE SYMBOL LIST 1 piston
2 upper part
3 lower part
4 piston crown
5 combustion bowl
6 ring wall
7 top land
8 ring belt
9, 9' pin boss
10, 10' pin bore
11 face side of the pin boss 9, 9'
12 piston axis
13, 13' piston skirt element
14 inner contact part
15 outer contact part
16 contact surface of the upper part 2
17 support rib of the lower part 3
18 contact surface of the lower part 3
19 contact surface
20 support crosspiece
21 contact surface
22 outer cooling channel
23 inlet opening
24 inner cooling channel
25 upper crown part of the lower part 3
26 expansion sleeve
27 first opening
28 crimping
29 nut
30 compression sleeve
31 pin
32 outside thread
33 cooling chamber
34 connection channel, oil inflow opening
35 opening, oil outflow opening
36 gap
37, 37', 37" run-off channel
38 cylindrical recess
39 bore
40 arrow
41 threaded pin
42 nut
43 second opening

What is claimed is:

1. A two-part piston for an internal combustion engine, comprising:
    an upper part that forms a piston crown;
    a cylindrical pin that lies coaxial to a piston axis and has an outside thread, said pin being formed and on an underside of the piston crown, facing away from the piston crown;
    a lower part that consists of a crown part, on an underside of which pin bosses having pin bores and skirt elements that connect the pin bosses with one another are disposed,
    an expansion sleeve formed on a second opening in the crown part that lies coaxial to the piston axis, said sleeve being directed upward and being elastically stretchable in the axial direction, said sleeve being made of a material that has a stretching limit that is higher as compared with the rest of the piston, and having a first opening at a piston-crown-side end so that the pin is introduced into the first and the second opening,
    wherein the first opening has a crimping that is directed radially inward, an inside, radius of which is greater than an outside radius of the pin, and
    wherein the upper part and the lower part are connected with one another by a nut screwed onto the outside thread of the pin, said nut resting against the crimping on the piston crown side and
    wherein the expansion sleeve is plastically deformed in the axial direction, in order to increase the stretching limit.

2. The piston according to claim 1, wherein the expansion sleeve is plastically deformed in the axial direction, proceeding from the lower piston part, by 0.5% to 5% of its length, in order to increase the stretching limit.

3. The piston according to claim 1, wherein the expansion sleeve is plastically deformed in the axial direction, proceeding from the lower piston part, by approximately 1% of its length, in order to increase the stretching limit.

4. The piston according to claim 2, wherein the expansion sleeve is stretched in the axial direction, proceeding from the lower piston part, in order to increase the stretching limit.

5. The piston according to claim 2, wherein the expansion sleeve is compressed in the axial direction, proceeding from the finished lower piston part, in order to increase the stretching limit.

\* \* \* \* \*